US008065579B2

(12) United States Patent
Hoshino et al.

(10) Patent No.: US 8,065,579 B2
(45) Date of Patent: Nov. 22, 2011

(54) RETRANSMISSION CONTROL SCHEME AND WIRELESS COMMUNICATION APPARATUS

(75) Inventors: Masayuki Hoshino, Kanagawa (JP); Ryohei Kimura, Kanagawa (JP); Yasuaki Yuda, Kanagawa (JP); Tomohiro Imai, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1126 days.

(21) Appl. No.: 11/816,885

(22) PCT Filed: Feb. 27, 2006

(86) PCT No.: PCT/JP2006/303615
§ 371 (c)(1),
(2), (4) Date: Aug. 22, 2007

(87) PCT Pub. No.: WO2006/093093
PCT Pub. Date: Sep. 8, 2006

(65) Prior Publication Data
US 2009/0031183 A1     Jan. 29, 2009

(30) Foreign Application Priority Data
Feb. 28, 2005    (JP) .................................. 2005-053269

(51) Int. Cl.
*G08C 25/02* (2006.01)
*H04L 1/18* (2006.01)
(52) U.S. Cl. ......... 714/748; 370/238; 370/331; 455/101
(58) Field of Classification Search ................... 714/748; 370/238, 331; 455/101
See application file for complete search history.

(56) References Cited

U.S. PATENT DOCUMENTS

| 7,068,628 | B2 * | 6/2006 | Li et al. .......................... 370/334 |
| 7,327,834 | B1 * | 2/2008 | Hiers et al. ................. 379/88.18 |
| 7,469,013 | B1 * | 12/2008 | Bolt et al. ..................... 375/260 |
| 7,889,130 | B2 * | 2/2011 | Murakami et al. ............ 342/377 |
| 2003/0031121 | A1 | 2/2003 | Sudo |
| 2004/0203456 | A1 * | 10/2004 | Onggosanusi et al. .... 455/67.13 |
| 2005/0117520 | A1 * | 6/2005 | Miyoshi ....................... 370/238 |

FOREIGN PATENT DOCUMENTS

JP     8-223110     8/1996
(Continued)

OTHER PUBLICATIONS

PCT International Search Report dated Jun. 6, 2006.
(Continued)

*Primary Examiner* — Sam Rizk
(74) *Attorney, Agent, or Firm* — Dickinson Wright PLLC

(57) ABSTRACT

A retransmission control scheme and a wireless communication apparatus wherein the efficiency of retransmission control is enhanced to further improve the system throughput. In this wireless communication apparatus (100), an error occurrence factor addressing part (140) receives information related to the error occurrence factor of a transmitted packet or information related to the schemes of forming or transmitting a retransmittal packet corresponding to that error occurrence factor, and switches, based on the received information, the schemes of forming or transmitting the retransmittal packet. In this way, the schemes of forming or transmitting the retransmittal packet can be switched in accordance with the error occurrence factor of the transmitted packet. At the end of receiving the retransmittal packet, therefore, the performing of a decoding processor the like in accordance with that scheme of forming or transmitting can enhance the efficiency of the retransmission control. As a result, the system throughput can be improved.

13 Claims, 9 Drawing Sheets

FOREIGN PATENT DOCUMENTS

| | | |
|---|---|---|
| JP | 2001-268158 | 9/2001 |
| JP | 2002044051 | 2/2002 |
| JP | 2004041548 | 2/2004 |
| JP | 2004112098 | 4/2004 |
| WO | 02/41548 | 5/2002 |

OTHER PUBLICATIONS

3GPP TS RAN WGI, TSG-RI(01)0879, "Increasing MIMO throughput with per-antenna rate control," Lucent Technologies, 2001, pp. 1-13.

Japanese Office Action dated Mar. 15, 2011.

* cited by examiner

RETRANSMISSION CONTROL SCHEME AND WIRELESS COMMUNICATION APPARATUS

TECHNICAL FIELD

The present invention relates to a retransmission control method and wireless communication apparatus. More particularly, the present invention relates to a retransmission control method and wireless communication apparatus in MIMO communication.

BACKGROUND ART

In recent years, as a technique for enabling large-capacity data communication such as images, attention has been directed toward MIMO (Multi-Input/Multi-Output) communication. In MIMO communication, the transmitting side transmits different items of transmission data (substreams) from a plurality of antennas, and a receiving side separates the original transmission data from a plurality of items of transmission data mixed over the channel using estimation values (for example, see Patent Document 1).

Actually, in MIMO communication, signals transmitted from a transmitting apparatus are received using the same number of antennas as the antennas of the transmitting apparatus or more, and, based on a pilot signal inserted in a signal received in each of the antennas, channel characteristics between the antennas are estimated. The estimated channel characteristics H are expressed by a 2×2 matrix when the number of transmitting side antennas is two and the number of receiving antennas is two. In MIMO communication, a transmission signal (substream) transmitted from each transmitting antenna is obtained based on the inverse matrix of the obtained channel characteristics H and a received signal obtained in each receiving antenna.

Further, automatic repeat request (ARQ) is generally performed whereby, when the bit error rate on the receiving side does not meet a predetermined value, the receiving side transmits a retransmission request signal to the transmitting side and, in response to the request, the transmitting side transmits the same transmission data again. Particularly, in packet transmission, data transmission without errors needs to be guaranteed, and this makes error control by ARQ indispensable. In addition, in packet transmission, although adaptive modulation and error correction are applied such that throughput increases by selecting an optimal modulation scheme and coding scheme in accordance with the state of the channel, packet errors are inevitable due to measurement error, control delay and the like, so that hybrid ARQ (hereinafter referred to as HARQ) is adopted incorporating FEC (Forward Error Correction) functions.

Thus, MIMO communication is performed using a plurality of antennas during data transmission, so that large-capacity data can be communicated, and, when received data is erroneous on the receiving side, data is retransmitted, and the receiving side combines the received data in the initial transmission and in retransmission by HARQ. By this means, increased throughput of wireless communication system is expected. Non-patent Document 1 also suggests applying HARQ to MIMO communication.

Patent Document 1: Japanese Patent Application Laid-Open No. 2002-44051
Non-patent Document 1: 3GPP TSG-RAN Working Group 1, Collection, R1-010879, "Increasing MIMO throughput with per-antenna rate control", Lucent Technologies

DISCLOSURE OF INVENTION

Problems to be Solved by the Invention

Incidentally, in the above conventional wireless communication system adopting MIMO communication and HARQ, when received data is erroneous on the receiving side, it is assumed that only systematic bits, which are information bits, only parity bits, which are redundant bits, or a combination thereof, are transmitted again. However, various causes are considered for errors in received data, and it is further considered that there are methods of dealing with errors in accordance with causes, but no consideration is given to these respects. Therefore, in the above described conventional wireless communication scheme, efficient retransmission control is hardly performed, thereby expecting further increase in throughput.

It is an object of the present invention to provide a retransmission control method and wireless communication apparatus for improving the efficiency of retransmission control and improving system throughput.

Means for Solving the Problem

The retransmission control method of the present invention is employed in MIMO communication and includes the steps of determining which error occurrence factor is a dominant error occurrence factor, and changing a forming scheme or a transmission scheme for a retransmission packet suitable for the determined error occurrence factor.

The wireless communication apparatus of the present invention adopts a MIMO communication scheme, and employs a configuration provided with: an error occurrence factor estimation section that determines which error occurrence factor is a dominant error occurrence factor, and a report information generation section that generates information relating to the error occurrence factor or information relating to a forming scheme or a transmission scheme for a retransmission packet suitable for the determined error occurrence factor.

Another wireless communication apparatus of the present invention adopts a configuration provided with: a receiving section that receives information about an error occurrence factor of a transmitted packet or information about a forming scheme or a transmission scheme for a retransmission packet suitable for the error occurrence factor, and a changing section that changes the forming scheme or the transmission scheme for the retransmission packet based on the received information.

ADVANTAGEOUS EFFECT OF THE INVENTION

According to the present invention, it is possible to provide a retransmission control method and wireless communication apparatus for improving the efficiency of retransmission control and further increasing system throughput.

BEST MODE FOR CARRYING OUT THE INVENTION

Figure 1:
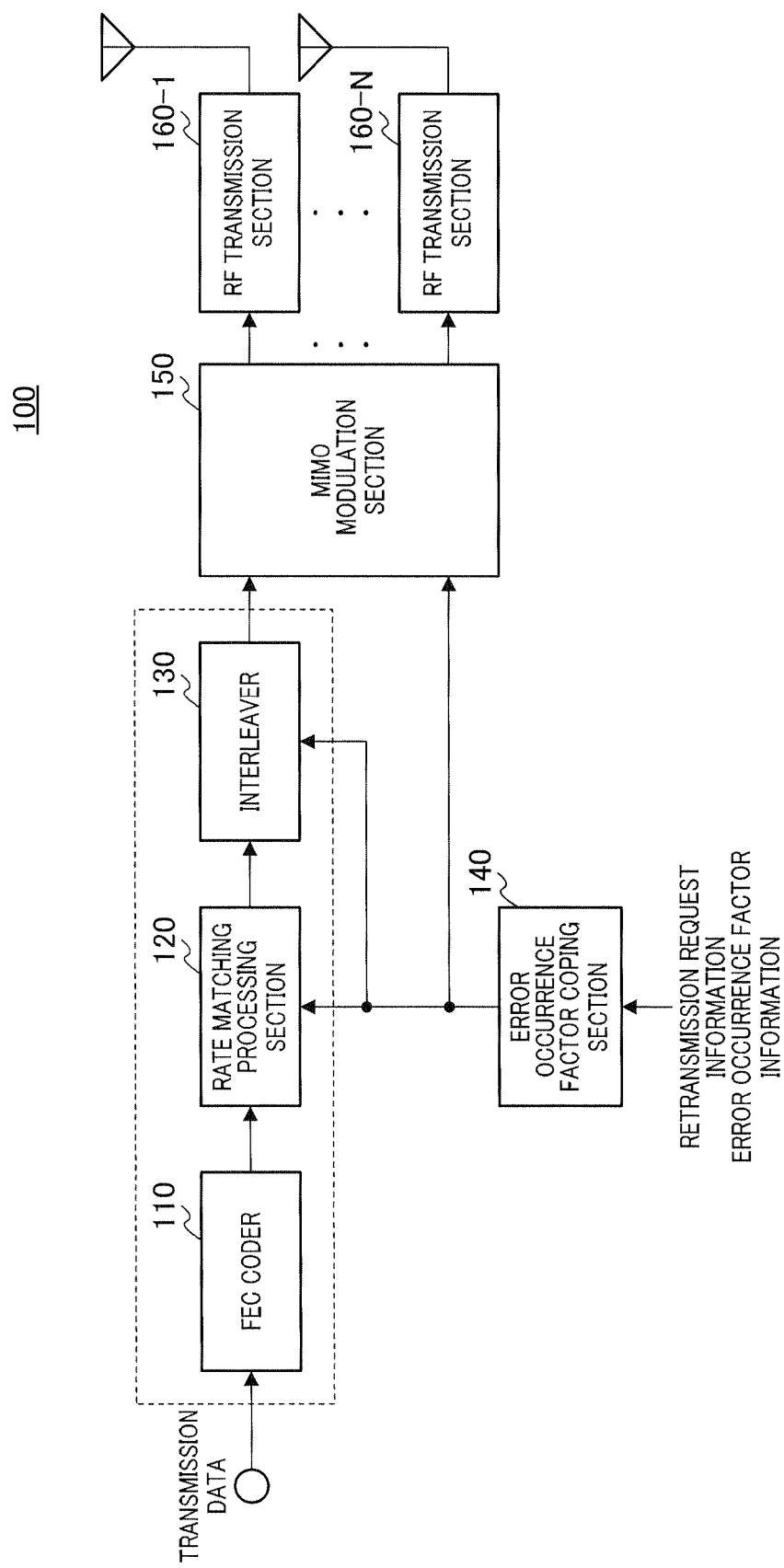
FIG. 1 is a block diagram illustrating a configuration of a wireless communication apparatus (packet transmitting side) according to Embodiment 1 of the present invention.

The inventors of the present invention have found out that, in a wireless communication system adopting MIMO communication and automatic repeat request (ARQ), system throughput can be increased by classifying error occurrence factors of received packets and estimating which class of error occurrence factor is dominant, and by performing retransmission control suitable for the estimated error occurrence factor.

In other words, one of features of the present invention is to estimate the error occurrence factor of a received packet and changes the forming scheme or transmission scheme of a retransmission packet according to the estimated error occurrence factor. Among assumed various error occurrence factors, as error occurrence factors in each embodiment, particularly, "noise" and "inter-stream interference" are dealt to give explanations. Here, "noise" means thermal noise originating from receiving circuit, interference components coming from other cells and the like, and "inter-stream interference" means that interference of multiplexed substreams is not sufficiently removed (multiplexed substreams are insufficiently separated) and multiplexed substreams influence one another.

Embodiments of the present invention will be described below in detail with reference to accompanying drawings. In addition in the embodiments, the same components are assigned the same reference numerals to omit redundant descriptions.

EMBODIMENT 1

As shown in FIG. 1, wireless communication apparatus 100 of Embodiment 1 has FEC coder 110, rate matching processing section 120, interleaver 130, error occurrence factor coping section 140, MIMO modulation section 150 and RF transmission sections 160-1 to 160-N.

FEC coder 110 performs error correcting coding (herein, turbo coding) on transmission data for the purpose of improved error correcting capabilities, and outputs the obtained systematic bit sequence and parity bit sequence to rate matching processing section 120.

Error occurrence factor coping section 140 receives error occurrence factor information together with retransmission request information (for example, NACK) transmitted from wireless communication apparatus 200 (described later). Then, error occurrence factor coping section 140 transmits various kinds of signals suitable for the content of error occurrence factor information to rate matching processing section 120, interleaver 130 and MIMO modulation section 150, thereby controlling a generating scheme, transmission scheme and the like of a retransmission packet.

To be more specific, error occurrence factor coping section 140 has a counter (not shown) therein, counts the number of times retransmission request information is received for the same packet, and outputs the count value to interleaver 130 as number-of-retransmission information for control. In other words, error occurrence factor coping section 140 is able to control interleaver 130 so as to perform interleaving by an interleaving pattern suitable for the number of retransmissions.

Further, in accordance with the input error occurrence factor information, error occurrence factor coping section 140 determines the coding rate, the pattern of puncturing/repetition and the like and outputs as coding information, to rate matching processing section 120 for control.

Specifically, when input error occurrence factor information provides that "inter-stream interference" is the dominant error occurrence factor, error occurrence factor coping section 140 controls rate matching processing section 120 such that error occurrence factor coping section 140 forms a bit sequence of the retransmission packet into a retransmission packet using a self-decodable format (that is, the format enabling the packet to be decoded by the packet itself on the receiving side of the packet). More specifically, error occurrence factor coping section 140 performs control such that, for example, the systematic bit sequence is left without processed, and puncturing is performed for the parity bit sequence. Here, the "dominant error occurrence factor" means a factor that has more influence upon occurrence of errors.

Meanwhile, when the input error occurrence factor information provides that "noise" is the dominant error occurrence factor, error occurrence factor coping section 140 controls rate matching processing section 120 to preferentially perform the puncturing/repetition processing on the parity bit sequence upon performing puncturing/repetition processing on the bit sequences of a retransmission packet.

Further, error occurrence factor coping section 140 outputs the number-of-retransmission information, coding information and modulation/MIMO multiplexing information, to MIMO modulation section 150 as control information.

Rate matching processing section 120 performs the puncturing/repetition processing on the systematic bit sequence and parity bit sequence inputted from FEC coder 110 using a predetermined coding rate and a predetermined puncturing/repetition pattern in the initial transmission, and outputs the systematic bit sequence and parity bit sequence subjected to the puncturing/repetition processing, to interleaver 130.

Meanwhile, in retransmission, rate matching processing section 120 performs the puncturing/repetition processing suitable for the input coding information, thereby performing control rate, and outputting the systematic bit sequence and parity bit sequence subjected to the puncturing/repetition processing, to interleaver 130. In other words, rate matching processing section 120 performs the puncturing/repetition processing using the coding rate and the pattern of puncturing/repetition processing suitable for the error occurrence factor information.

Interleaver 130 interleaves the systematic bit sequence and parity bit sequence subjected to the puncturing/repetition processing using a predetermined interleaving pattern in the initial transmission and outputs the result to MIMO modulation section 150. Meanwhile, in retransmission, interleaver 130 performs interleaving using an interleaving pattern suitable for the number-of-retransmission information from error occurrence factor coping section 140, and outputs the result to MIMO modulation section 150.

MIMO modulation section 150 performs serial-to-parallel conversion to distribute the interleaved data into the same number of substreams as the number of antennas of wireless communication apparatus 100. Then, in the initial transmission, MIMO modulation section 150 modulates each substream using a predetermined modulation scheme, and outputs the result to predetermined RF transmission section 160. Meanwhile, in retransmission, MIMO modulation section 150 performs modulation using a modulation scheme suitable for the modulation/MIMO multiplexing information from error occurrence factor coping section 140, and outputs the result to RF transmission section 160 suitable for the modulation/MIMO multiplexing information. In addition, regardless of the initial transmission or retransmission, MIMO modulation section 150 outputs control information including number-of-retransmission information, coding information and modulation/MIMO multiplexing information to transmission RF section 160 without performing MIMO modulation. By this means, the receiving side of the control information is able to extract the control information without performing MIMO demodulation.

Each of transmission RF sections 160 converts the inputted modulated signal into a radio frequency signal and transmits the radio frequency signal via the corresponding antenna.

According to the above configuration, a packet formation function block comprised of FEC coder 110, rate matching processing section 120 and interleaver 130 in wireless communication apparatus 100, is able to change the forming scheme of a packet according to various kinds of information received from error occurrence factor coping section 140. As a result, it is possible to make the forming technique for the packet in the initial transmission and the forming technique for packets retransmitted later. As described above, the packet forming technique includes, for example, the puncturing/repetition processing technique and the interleaving technique.

Further, MIMO modulation section 150 in wireless communication apparatus 100 is able to change the output destination (RF transmission section 160) of substreams suitable for the modulation/MIMO multiplexing information received from error occurrence factor coping section 140. As a result, MIMO modulation section 150 is able to change the output destination in the initial transmission and the output destination in subsequent retransmissions, that is, change the transmission scheme for packets.

Figure 2:
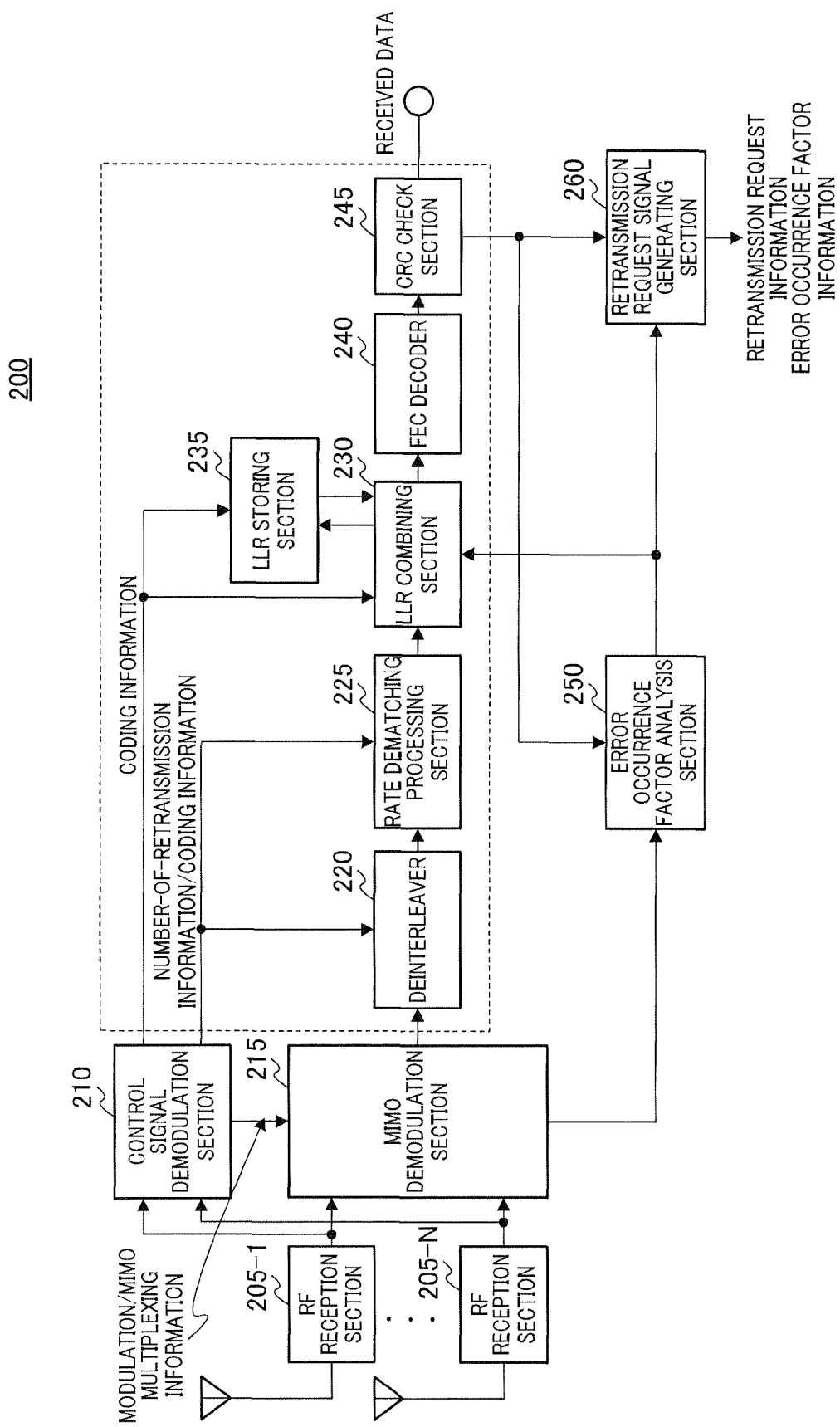
FIG. 2 is a block diagram illustrating a configuration of another wireless communication apparatus (packet receiving side) according to Embodiment 1 of the present invention.

As shown in FIG. 2, wireless communication apparatus 200 of Embodiment 1 has RF reception sections 205-1 to 205-N, control signal demodulation section 210, MIMO demodulation section 215, deinterleaver 220, rate dematching processing section 225, LLR (Log Likelihood Ratio) combining section 230, LLR storing section 235, FEC decoder 240, CRC check section 245, error occurrence factor analysis section 250, and retransmission request signal generating section 260.

A signal received in each antenna is subjected to frequency conversion in corresponding RF reception section 205, and each frequency-converted signal is inputted to control signal demodulation section 210 and MIMO demodulation section 215.

Control signal demodulation section 210 extracts the control information transmitted from wireless communication apparatus 100 from the frequency-converted signal. Then, control signal demodulation section 210 outputs the modulation/MIMO multiplexing information included in the control information to MIMO demodulation section 215, outputs the number-of-retransmission information and coding information to deinterleaver 220 and rate dematching processing section 225, and further outputs the coding information to LLR storing section 235 and LLR combining section 230.

MIMO demodulation section 215 performs channel estimation from each frequency-converted signal from RF reception section 205, using a pilot signal added to each substream in wireless communication apparatus 100. Then, based on the obtained channel estimation value and the modulation/MIMO multiplexing information from control signal demodulation section 210, MIMO demodulation section 215 performs predetermined processing such as spatial division, interference cancellation and the like, thereby extracting the signal corresponding to each substream generated on the transmitting side. Further, MIMO demodulation section 215 makes a soft decision and calculates the LLR value for on the signal corresponding to each extracted substream.

Deinterleaver 220 performs deinterleaving with respect to the LLR value that is calculated in MIMO demodulation section 215 from the signal corresponding to the substream of the first transmission (which is not a retransmission) using an interleaving pattern suitable to the number-of-retransmission information (which is zero for the initial transmission), that is, using a predetermined interleaving pattern used in interleaver 130 of wireless communication apparatus 100. Meanwhile, deinterleaver 220 performs deinterleaving on a signal corresponding to the substream of retransmission using an interleaving pattern according to the number-of-retransmission information from control signal demodulation section 210.

Rate dematching processing section 225 performs rate dematching processing suitable for the number-of-retransmission information and coding information about the deinterleaved LLR value.

LLR combining section 230 outputs the LLR value subjected to rate dematching in the initial transmission to LLR storing section 235 to prepare for retransmission, while further outputting the LLR value to FEC decoder 240. In addition, LLR storing section 235 stores the LLR value subjected to rate dematching in association with the coding information from control signal demodulation section 210.

Further, when LLR combining section 230 receives error occurrence factor information from error occurrence factor analysis section 250 (described later) namely when an error occurs and a packet is retransmitted from wireless communication apparatus 100, LLR combining section 230 performs "predetermined processing" according to the content of the error occurrence factor information and the coding information inputted from control signal demodulation section 210 in retransmission of the packet.

Figure 3:
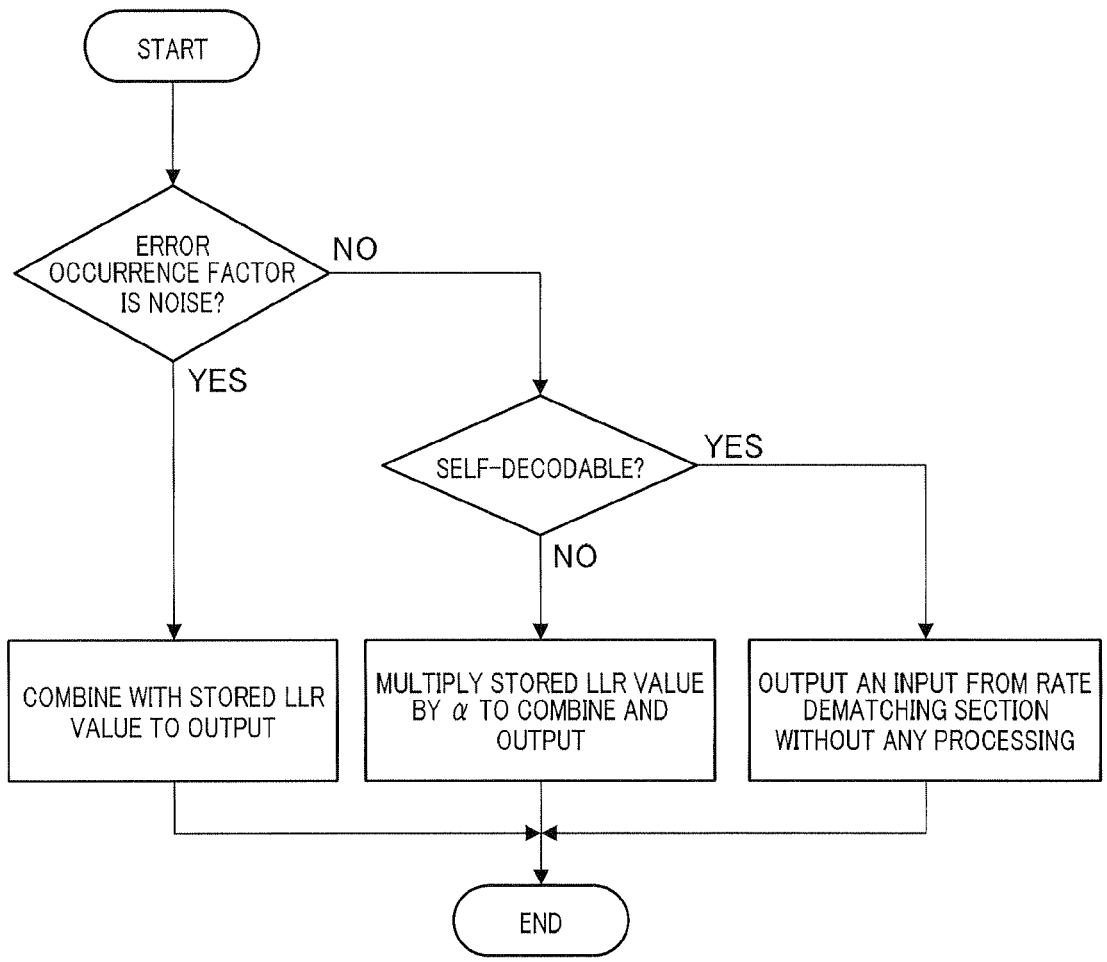
FIG. 3 is a flow chart for explanation of the operation of the wireless communication apparatus of FIG. 1.

The "predetermined processing" is specifically performed as shown in FIG. 3. In other words, as shown in the figure, when error occurrence factor information provides that "noise" is the dominant error occurrence factor, LLR combining section 230 combines the LLR value previously stored in LLR storing section 235 and the LLR value from rate dematching processing section 225 for retransmission, and outputs the combined LLR value to FEC decoder 240. By this means, it is possible to perform decoding reducing the influence of "noise". In other words, parity bits of turbo code are generated by recursive systematic convolutional code, and include information of a plurality of convoluted systematic bits. In other words, a plurality of parity bits having information of one systematic bit exist, thereby providing an advantage of suppressing "noise" by utilizing the advantage of the amount of information of a plurality of parity bits for noise randomly occurring in each bit.

Meanwhile, when error occurrence factor information provides that "inter-stream interference" is the dominant error occurrence factor and the coding information from control signal demodulation section 210 indicates a self-decodable format, LLR combining section 230 outputs the LLR value without modification from rate dematching processing section 225 for retransmission to FEC decoder 240. In other words, in this case, LLR combining section 230 does not perform combining with the LLR value stored in LLR storing section 235. By this means, the use of a self-decodable format makes it not necessary to use a LLR value that is stored earlier in LLR storing section 235 and that is likely to be influenced by inter-stream interference, thereby reducing the influence of inter-stream interference at the input to FEC decoder 240.

Further, when error occurrence factor information provides that "inter-stream interference" is the dominant error occurrence factor and the coding information from control signal demodulation section 210 indicates a self-decodable format is not used, LLR combining section 230 combines the value obtained by multiplying the LLR value previously stored in LLR storing section 235 by $\alpha$ (a positive value less than "1") and the LLR value from rate dematching processing section 225 for retransmission, and outputs a combined LLR value is to be combine with the LLR value from rate dematching processing section 225 for retransmission, that is stored earlier in LLR storing section 235 and that is likely to be adversely influence by inter-stream interference, is multiplied by $\alpha$ (a positive value less than "1"), so that the influence of inter-stream interference is reduced and coding gain is achieved.

FEC decoder 240 outputs a decoding result obtained by performing error correcting decoding (herein, turbo decoding) on the LLR value from LLR combining section 230 to CRC check section 245.

CRC check section 245 performs error detection on the decoding result from FEC decoder 240. Then, when an error is not detected, CRC check section 245 outputs the decoding result from FEC decoder 240 to a predetermined function block as received data. Meanwhile, when an error is detected, CRC check section 245 outputs error detection information indicating that an error is detected, to error occurrence factor analysis section 250 and retransmission request signal generating section 260.

Error occurrence factor analysis section 250 measures the variation of channel estimation values over time obtained in MIMO demodulation section 215, namely, the variation of channel estimation values in the time domain. To be more specific, for the variation of the channel estimation values in the time domain, for example, the absolute value of the variation rate of channel estimation values may be used.

Further, error occurrence factor analysis section 250 measures the signal intensity of the signal corresponding to each substream extracted in MIMO demodulation section 215.

Then, upon receiving the error detection information from CRC check section 245, based on the measured variation of channel estimation values over time and the signal intensity of the signal corresponding to each substream, error occurrence factor analysis section 250 estimates the factor that caused the error (i.e. "error occurrence factor"). Specifically, in this embodiment, whether the dominant error occurrence factor is "noise" or "inter-stream interference" is determined, for example, using "criteria" described below.

(1) If the measured variation of channel estimation values over time is at a predetermined threshold or greater, it is determined that "inter-stream interference" is the dominant error occurrence factor. In other words, when the calculation cycle of the channel estimation value (that is a cycle determined by an interval inserted a pilot symbol) is short relative to the variation of channel estimation values over time, which corresponds to fading variation speed, it is determined that "inter-stream interference" is the dominant error occurrence factor.

(2) If among the signals corresponding to the substreams a lower signal intensity than a predetermined threshold is measured, noise is determined to be the dominant error occurrence factor.

Next, error occurrence factor analysis section 250 outputs error occurrence factor information identifying the error occurrence factor estimated to be dominant, to LLR combining section 230 and retransmission request signal generating section 260.

Referring to FIG. 2 again, upon receiving the error detection information from CRC check section 245, retransmission request signal generating section 260 generates the retransmission request information (for example, NACK) and outputs the result. Further, retransmission request signal generating section 260 outputs the error occurrence factor information from error occurrence factor analysis section 250. In addition, the retransmission request information and the error occurrence factor information may be outputted separately or outputted collectively. Then, the retransmission request information and the error occurrence factor information output from retransmission request signal generating section 260 is transmitted to wireless communication apparatus 100.

According to the above configuration, when an error occurs in a packet transmitted from wireless communication apparatus 100, error occurrence factor analysis section 250 in wireless communication apparatus 200 is able to determine the dominant error occurrence factor, based on the measurement result of the variation of channel estimation values over time obtained in MIMO demodulation section 215 and the measurement result of the signal intensity of the signal corresponding to each substream extracted in MIMO demodulation section 215.

Then, a decoding function block comprised of deinterleaver 220, rate dematching processing section 225, LLR combining section 230, LLR storing section 235, FEC decoder 240 and CRC check section 245 in wireless communication apparatus 200, is able to perform decoding processing on a packet retransmitted from wireless communication apparatus 100 using a scheme suitable for the error occurrence factor determined in above error occurrence factor analysis section 250, using a decoding scheme associated with the scheme suitable for the error occurrence factor.

Next, referring to FIG. 4, the operation of the wireless communication system comprised of wireless communication apparatus 100 and wireless communication apparatus 200 will be explained.

In steps ST1001 to ST1004, wireless communication apparatus 100 performs error correcting coding on a transmission bit sequence of a transmission packet of the initial transmission, and transmits the transmission packet together with control information required for MIMO demodulation on the receiving side.

In steps ST1005 and ST1006, wireless communication apparatus 200 performs MIMO demodulation on the received packet, obtains a LLR value by soft decision, and performs error correcting decoding.

In step ST1007, wireless communication apparatus 200 performs error detection on the result of error correcting decoding in step ST1006. It is herein assumed that an error is detected.

When an error is detected, in step ST1008, wireless communication apparatus 200 estimates (analyzes) the dominant error occurrence factor using the "criteria" described above. In addition, in FIG. 4, it is assumed that the dominant error occurrence factor is "noise"

In steps ST1009 and ST1010, wireless communication apparatus 200 transmits the retransmission request information and error occurrence factor information to wireless communication apparatus 100.

In steps ST1011 to ST1014, wireless transmission apparatus 100 retransmits the packet corresponding to the retransmission request information from wireless communication apparatus 200. Specifically, as described above, the packet forming function block comprised of FEC coder 110, rate matching processing section 120 and interleaver 130 in wireless communication apparatus 100 forms a forming scheme for the packet suitable for the error occurrence factor information by control of error occurrence factor coping section 140. Further, MIMO modulation section 150 in wireless communication apparatus 100 forms a transmission scheme for the packet suitable for the error occurrence factor information by control of error occurrence factor coping section 140. Then, wireless communication apparatus 100 transmits the transmission bit sequence of the formed retransmission packet and the control information.

In step ST1015, wireless communication apparatus 200 performs MIMO demodulation on the retransmission packet.

In step ST1016, as the result of estimation in step ST1008, the dominant error occurrence factor is estimated to be "noise", and wireless communication apparatus 200 combines the LLR value of the initial transmission obtained in steps ST1005 and ST1006 and the LLR value obtained from the retransmission packet.

In step ST1017, wireless communication apparatus 200 performs error correcting decoding using the LLR value combined in step ST1016.

In step ST1108, wireless communication apparatus 200 performs error detection on the result of error correcting decoding in step ST1017. It is herein assumed that an error is not detected.

When an error is not detected, in step ST1019, wireless communication apparatus 200 returns a reception response (for example, ACK) to wireless communication apparatus 100.

Figure 4:
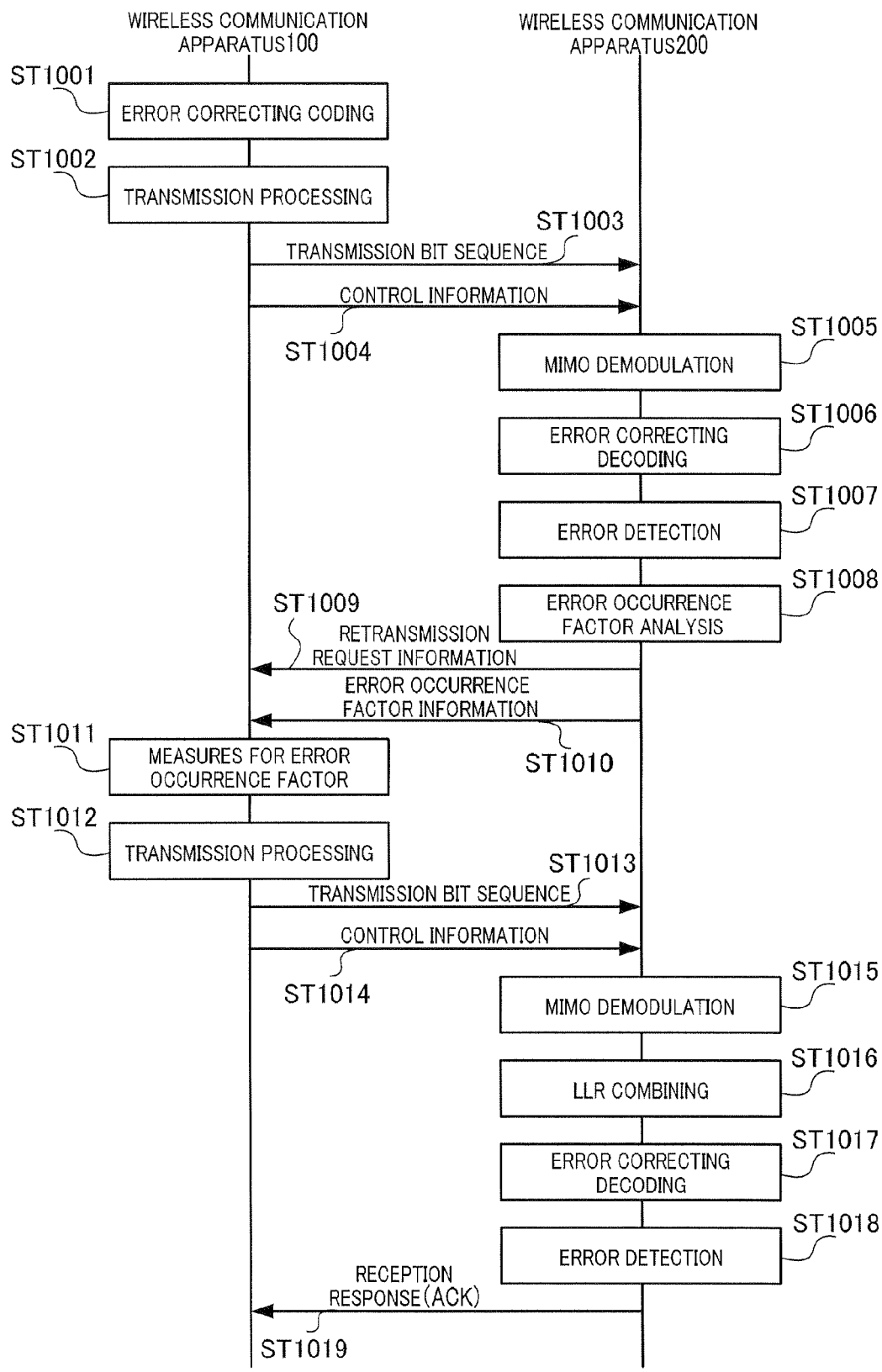
FIG. 4 is a diagram for explanation of the operation of a wireless communication system comprised of the wireless communication apparatus of FIG. 1 and the wireless communication apparatus of FIG. 2.

In addition, as a result of estimation in step ST1008, when the dominant error occurrence factor is estimated to be "inter-stream interference", as described above, wireless communication apparatus 100 generally retransmits a packet in a self-decodable format, and LLR combining shown in step ST1016 of FIG. 4 is not performed, and error correcting decoding and error detection are performed only based on the LLR value obtained from the packet for retransmission.

In addition, in the above explanation, wireless communication apparatus 200 on the packet receiving side transmits error occurrence factor information to wireless communication apparatus 100, but the present invention is not limited thereto. The receiving side may specify coding information, modulation/MIMO multiplexing information and number-of-retransmission information suitable for the error occurrence factor information and transmit these pieces of information.

Thus, according to Embodiment 1, in the wireless communication system which is comprised of wireless communication apparatuses 100 and 200 and to which MIMO communication is applied, the dominant error occurrence factor is determined from among error occurrence factors, and the forming scheme or the transmission scheme of a retransmission packet is changed according to the determined error occurrence factor. Particularly, in this embodiment, whether the dominant error occurrence factor is inter-stream interference or noise is determined, and the forming scheme or the transmission scheme of a retransmission packet is changed according to the determined error occurrence factor.

In this way, it is possible to perform the operations suitable for the error occurrence factor in forming or transmitting a retransmission packet, thereby providing an advantage of improved efficiency of retransmission control. As a result, throughput is increased in the system.

Further, the above determination of the dominant error occurrence factor is carried out such that inter-stream interference is determined to be dominant when the variation of channel estimation values over time is at a predetermined level or greater, in other words, when the calculation cycle of channel estimation value is short with respect to the variation of channel estimation values in the time domain, and noise is determined to be dominant when there is a substream has a lower received intensity than a predetermined level.

By making these determinations, the dominant error occurrence factor can be specified from inter-stream interference and noise.

Further, according to Embodiment 1, wireless communication apparatus 200 is provided with error occurrence factor analysis section 250 that determines the dominant error occurrence factor, and retransmission request signal generating section 260 that generates information (i.e. error occurrence factor information) relating to the error occurrence factor or information (i.e. coding information, modulation/MIMO multiplexing information, and number-of-retransmission information) relating to a forming scheme or a transmission scheme for a retransmission packet suitable for the error occurrence factor. Particularly, in this embodiment, error occurrence factor analysis section 250 determines whether the dominant error occurrence factor is inter-stream interference or noise.

By this means, wireless communication apparatus 200 is able to generate feedback information according to the error occurrence factor for wireless communication apparatus 100 of the packet transmitting side, so that, by using the feedback information, the transmitting side can take appropriate measures to error occurrence factors, that is to say, apply the forming schemes and transmission schemes suitable for the error occurrence factors for a retransmission packet. As a result, the efficiency of retransmission control can be improved and throughput of the system can be improved.

Further, error occurrence factor analysis section 250 determines that stream interference is dominant when the variation of the channel estimation values over time is less than a predetermined level, in other words, when the calculation cycle of the channel estimation value is sufficiently large in respect to the variation of channel estimation values over time, and when the reception intensity does not meet a predetermined level in substreams, noise is determined to be dominant.

By making these determinations, the dominant error occurrence factor is specified from inter-stream interference and noise.

Further, wireless communication apparatus 200 is provided with the decoding function block (deinterleaver 220, rate dematching processing section 225, LLR combining section 230, LLR storing section 235, FEC decoder 240 and CRC check section 245) that performs decoding using only a retransmission packet, when inter-stream interference is the dominant error occurrence factor and a self-decodable format is used for the retransmission packet formed by a forming scheme suitable for the error occurrence factor.

By this means, the use of a self-decodable format makes it not necessary to use a LLR value that is transmitted earlier and that is likely to be influenced by inter-stream interference, thereby reducing the influence of inter-stream interference at the input to FEC decoder 240.

Further, when a self-decodable format is not used for a retransmission packet formed by a forming scheme corresponding to the error occurrence factor, the above-mentioned decoding function block combines the value obtained by multiplying a LLR value obtained from the packet that is transmitted earlier and that corresponds to the retransmission packet, by a positive value less than "1", and a LLR value obtained from the retransmission packet, and decode the combination.

By this means, the LLR value that is transmitted earlier, and that is likely to be adversely influence by inter-stream interference, is multiplied by a (a positive value less than "1"), so that the influence of inter-stream interference is reduced and coding gain is achieved.

Further, wireless communication apparatus 200 is provided with decoding function block (deinterleaver 220, rate dematching processing section 225, LLR combining section 230, LLR storing section 235, FEC decoder 240 and CRC check section 245). The decoding function block combines a LLR value obtained from a packet that is transmitted earlier and a LLR value obtained from the retransmission packet, when noise is the dominant error occurrence factor, and decodes the combination.

By this means, it is possible to perform decoding reducing the influence of "noise".

Further, according to Embodiment 1, wireless communication apparatus 100 is provided with error occurrence factor coping section 140 that receives information related to error occurrence factor of a transmitted packet or information related to the forming scheme or the transmission scheme for a retransmission packet corresponding to the determined error occurrence factor, and changes the forming scheme or the transmission scheme of the retransmission packet based on the received information.

By this means, it is possible to change the forming scheme or the transmission scheme of a retransmission packet according to the error occurrence factor of the transmitted packet, so that, by performing decoding processing and so on at the receiving side of the retransmission packet according to the forming scheme or the transmission scheme, the efficiency of retransmission control can be improved. As a result, throughput is increased in the system.

Further, wireless communication apparatus 100 is provided with the packet formation function blocks (FEC coder 110, rate matching processing section 120 and interleaver 130) that form a retransmission packet using a different pattern from the puncturing pattern, repetition pattern, or interleaving pattern of a packet transmitted earlier, when the error occurrence factor is noise.

By this means, since it is possible to form a retransmission packet having a different form from a packet transmitted earlier, so that the receiving side can use both the earlier transmitted packet and the retransmission packet having a different form from the earlier transmitted packet in decoding and suppress "noise". As a result, the receiving side is able to receive the packet correctly in a small number of retransmissions, so that the efficiency of retransmission control can improve, and, as a result, throughput is increased in the system.

Further, wireless communication apparatus 100 is provided with MIMO modulation section 150 that transmits a retransmission packet by changing to different mode from the mapping pattern of modulation symbols of a previously transmitted packet and stream allocation to antennas, when the error occurrence factor is noise.

By this means, it is possible to transmit a retransmission packet in a different transmission scheme from a packet transmitted earlier, so that the receiving side can utilize the packet transmitted earlier and the retransmission packet in a transmission scheme different from that of the packet for decoding, and suppress "noise". As a result, the receiving side is able to receive the retransmission packet correctly in a small number of retransmissions, so that the efficiency of retransmission control can improve, and, as a result, throughput is increased in the system.

EMBODIMENT 2

In Embodiment 1, a data sequence subjected to error correcting coding, rate control and interleaving is divided into substreams and then transmitted in MIMO. On the other hand, in Embodiment 2, the predetermined unit of transmission data is first divided into substreams, each of the substreams are processed such as error correcting coding, rate control and interleaving, and the processed substreams are transmitted in MIMO. In other words, in Embodiment 2, each substream is processed as a packet, and errors are detected for each of the packets (substreams), and then control retransmission.

Figure 5:
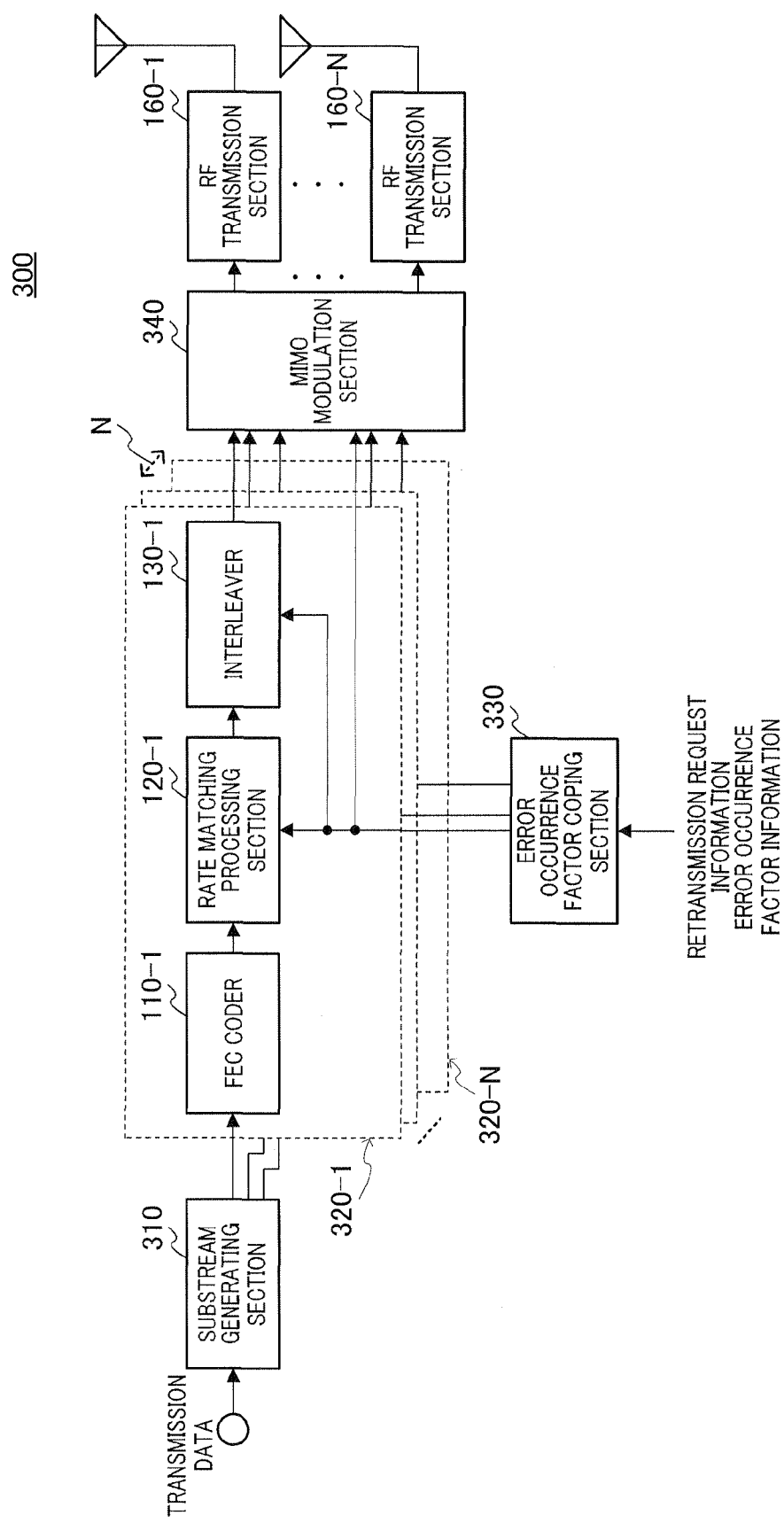
FIG. 5 is a block diagram illustrating a configuration of a wireless communication apparatus (packet transmitting side) according to Embodiment 2 of the present invention.

As shown in FIG. 5, wireless communication apparatus 300 has substream generating section 310, packet forming sections 320-1 to 320-N, error occurrence factor coping section 330 and MIMO modulation section 340.

Substream generating section 310 receives transmission data and divide the transmission data into N substreams. Then, the substreams are inputted to respective packet forming sections 320-1 to 320-N.

Each packet forming section 320 basically has the same configuration of the packet forming function block in wireless communication apparatus 100 of Embodiment 1, and is specifically comprised of FEC coder 110, rate matching processing section 120 and interleaver 130. However, the difference from in wireless communication apparatus 100 is that a packet undergoing the processing is a substream.

In other words, each packet forming section 320 changes forming schemes of a packet suitable for various kinds of information received from error occurrence factor coping section 330. As a result, it is possible to change the forming scheme for a packet in the initial transmission and the forming scheme for a subsequent packet to retransmit.

Error occurrence factor coping section 330 receives the error occurrence factor information packet units (substreams), outputs various kinds of information (coding information, number-of-retransmission information and modulation/MIMO multiplexing information) suitable for the error occurrence factor information to packet forming section 320 corresponding to the packet and MIMO modulation section 340, thereby controlling the generation scheme, the transmission scheme and the like of a retransmission packet.

Upon receiving the packet for retransmission from packet forming section 320, MIMO modulation section 340 skips transmission of a packet from another packet forming section 320, and outputs only the packet for retransmission to RF transmission section 160. At this point, MIMO modulation section 340 is able to change the output destination (RF transmission section 160) of the packet according to the modulation/MIMO multiplexing information. As a result, MIMO modulation section 340 is able to change the output destination in the initial transmission and in subsequent retransmissions, that is, to change the transmission scheme for the packet.

In wireless communication apparatus 300 with the above configuration, when the error occurrence factor information provides that "noise" is the dominant error occurrence factor, packet forming section 320 interleaves a packet for retransmission using a different interleaving pattern from a pattern for a packet in the initial transmission. Further, MIMO modulation section 340 uses a different mapping pattern from the pattern for the packet in the initial transmission upon MIMO modulation. Alternatively, MIMO modulation section 340 changes the antenna (beam) used in MIMO transmission to a different one from the initial transmission.

Meanwhile, when the error occurrence factor information provides that "inter-stream interference" is the dominant error occurrence factor, packet formation section 320 forms a retransmission packet in a self-decodable format, and at this timing, skips transmission of a packet from another packet forming section 320. Further, packet formation section 320 changes an antenna (beam) used in transmitting the retransmitting antenna from the one of the initial transmission, and at this timing, skips a packet transmission from another packet forming section 320.

Figure 6:
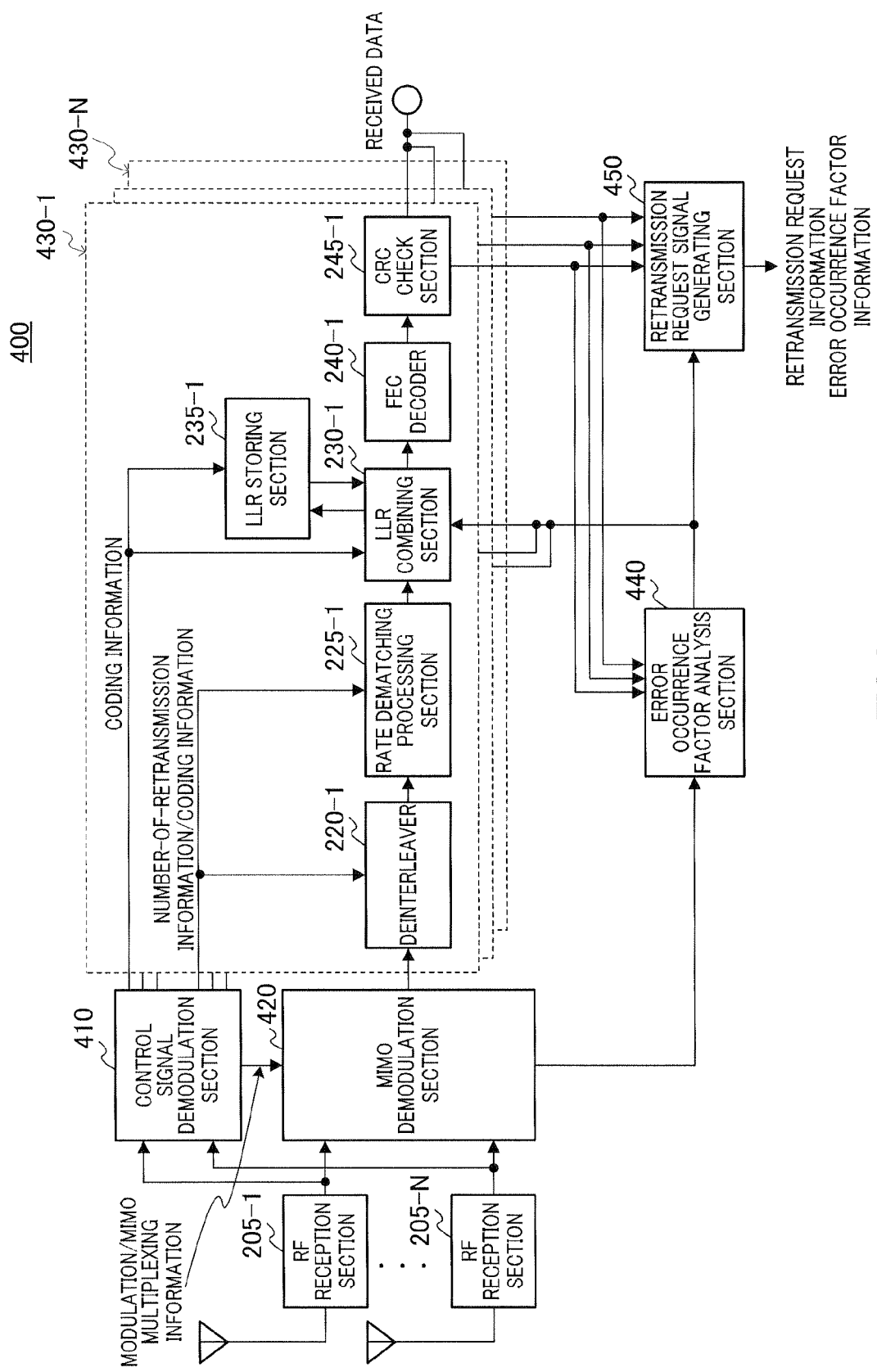
FIG. 6 is a block diagram illustrating a configuration of another wireless communication apparatus (packet receiving side) according to Embodiment 2 of the present invention.

As shown in FIG. 6, wireless communication apparatus 400 of Embodiment 2 has control signal demodulation section 410, MIMO demodulation section 420, decoding section 430, error occurrence factor analysis section 440, and retransmission request signal generating section 450.

MIMO demodulation section 420 performs MIMO demodulation using the modulation/MIMO multiplexing information extracted in control signal demodulation section 410. Then, MIMO demodulation section 420 outputs the MIMO-demodulated packet to corresponding decoding section 430.

When the aforementioned MIMO-demodulated packet has an error, error detection information is inputted to error occurrence factor analysis section 440. Upon receiving error detection information, error occurrence factor analysis section 440 estimates an error occurrence factor and outputs, error occurrence factor information to LLR combining section 230 of corresponding decoding section 430 and retransmission request signal generating section 450.

Retransmission request signal generating section 450 adds the identification information of the packet where the error occurs to the retransmission request information and the error occurrence factor information and outputs the result.

Thus, Embodiment 2 basically provides the same advantage as Embodiment 1. In addition, retransmission control can be performed on a per substream basis, so that the amount of information of packets to be retransmitted can be decreased, thereby improving the efficiency of retransmission control. As a result, throughput is increased in the system.

EMBODIMENT 3

In Embodiment 1, retransmission control is described in one-to-one communication between wireless communication apparatuses 100 and 200. On the other hand, Embodiment 3 relates to a system utilizing the error occurrence factor information for users assignments in a wireless communication apparatus that performs communication with a plurality of wireless communication apparatuses 200 (users.)

Figure 7:
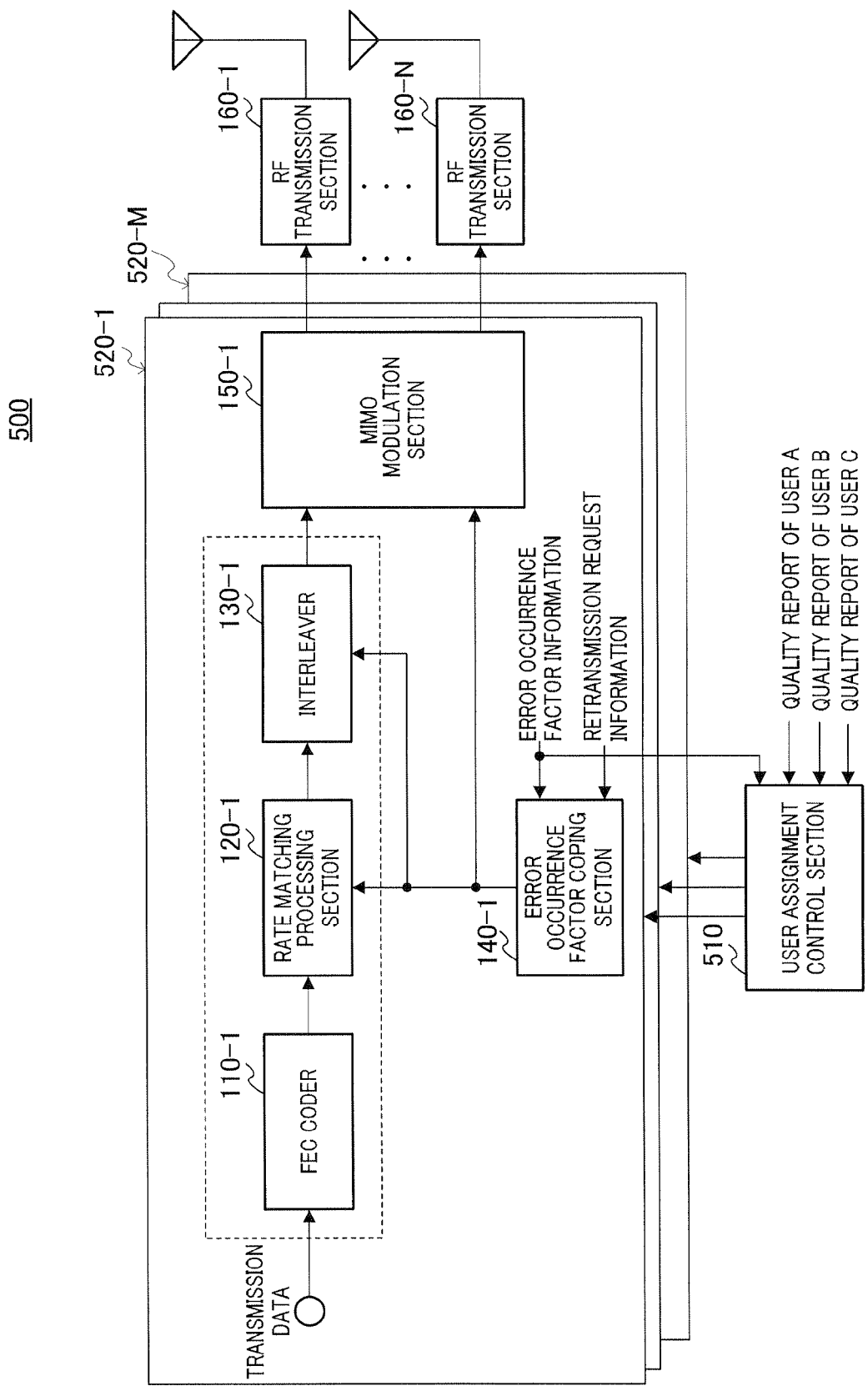
FIG. 7 is a block diagram illustrating a configuration of a wireless communication apparatus (packet transmitting side) according to Embodiment 3 of the present invention.

As shown in FIG. 7, wireless communication apparatus 500 of Embodiment 3 has user assignment control section 510 and signal processing sections 520-1 to 520-M (M is the number of apparatuses with which wireless communication apparatus 500 is able to communicate at the same time). This signal processing section 520 has the same principle configuration as wireless communication apparatus 100.

User assignment control section 510 receives a quality report on radio quality between each of wireless communication apparatuses (users) and wireless communication apparatus 500 transmitted from the connected wireless communication apparatuses (users A to C in FIG. 7).

Then, when an error is detected in a packet transmitted to a user with which communication is currently performed, error occurrence factor information from the user is inputted to user assignment control section 510. Then, when error occurrence factor information provides that "noise" is the dominant error occurrence factor, user assignment control section 510 continues the operation of signal processing section 520 for the user that transmits the error occurrence factor information without switching the user, and retransmission processing of the packet is performed. In addition, the retransmission processing of the packet is the same as in wireless communication apparatus 100 of Embodiment 1.

Meanwhile, when error occurrence factor information indicates that "inter-stream interference" is the dominant error occurrence factor, user assignment control section 510 performs control whereby a switch is made from the user from which that dominant error occurrence factor arrived, to another user. That is to say, user assignment control section 510 performs control that operates signal processing section 520 corresponding to the new, switched user. By this means, when "inter-stream interference" is the dominant error occurrence factor, an error is likely to occur again due to "inter-stream interference" even when the packet is retransmitted, so that, by performing packet transmission to another user first, the use efficiency of the system can be improved. Further, a time interval can be provided by transmitting a packet to another user and by subsequently transmitting a retransmission packet, thereby providing a situation where interference is less likely to occur.

In addition, the quality report and error occurrence factor information transmitted from users with which communications are currently performed may be transmitted separately or collectively.

Thus, according to Embodiment 3, wireless communication apparatus 500 is provided with user assignment control section 510 which receives information about the error occurrence factor of the transmitted packet or information about the forming scheme or transmission scheme for a retransmission packet suitable for the error occurrence factor, and switches the execution order between transmission of the retransmission packet and packet transmission to another user based on the received information.

By this means, it is possible to control whether to perform a retransmission of a packet where an error occurs or a packet transmission to another user suitable for the error occurrence factor, earlier performing packet transmission to another user can improve the efficient use of the system when "inter-stream interference" is the dominant error occurrence factor.

Other Embodiments (1) In Embodiments 1 and 2, a means for estimating an error occurrence factor is provided in wireless communication apparatuses 200 and 400 that are on the packet receiving side, but the present invention is not limited, and the estimator may be provided in a wireless communication apparatus on the packet transmitting side.

Figure 8:
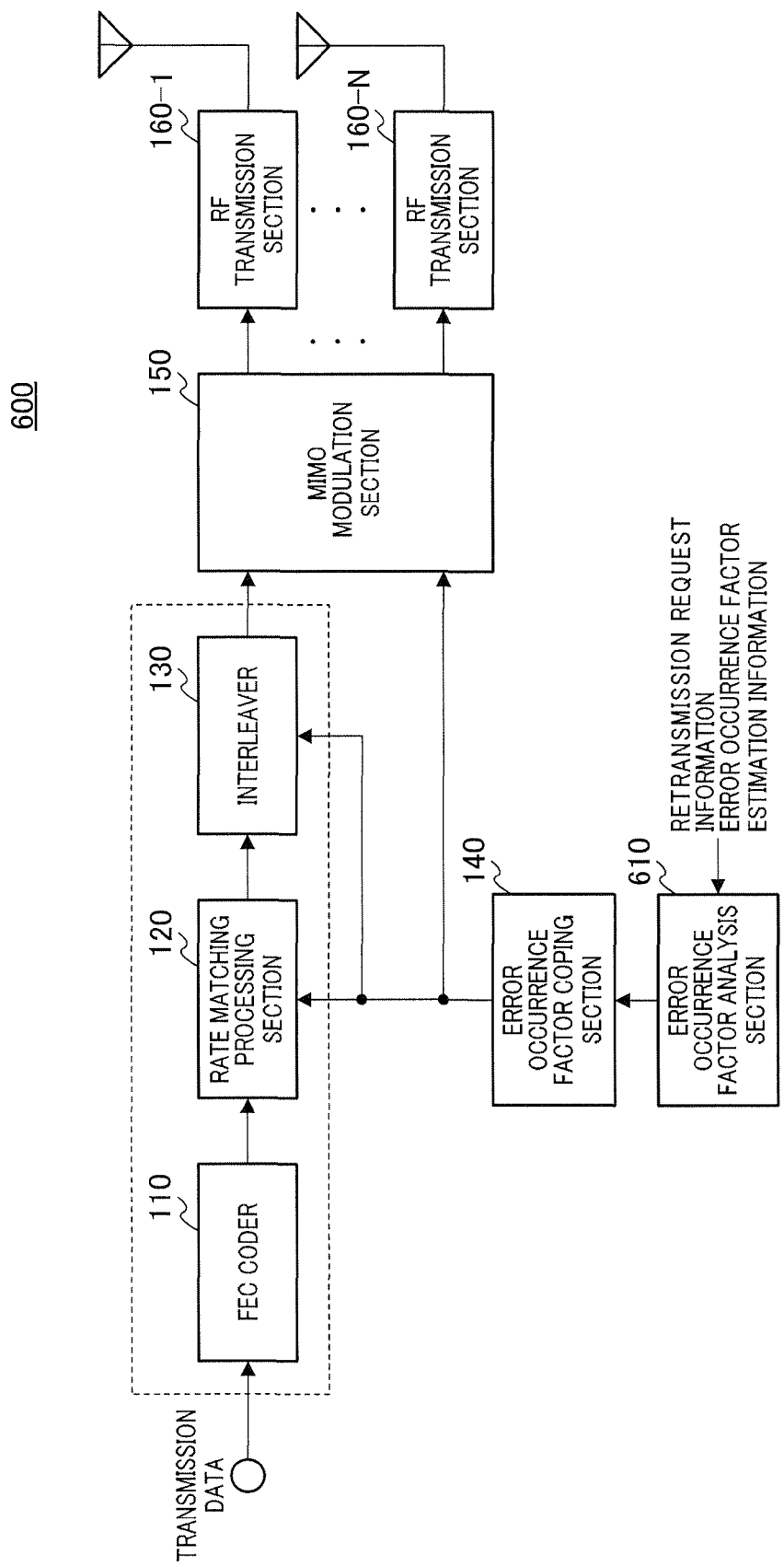
FIG. 8 is a block diagram illustrating a configuration of a wireless communication apparatus (packet transmitting side) according to another embodiment of the present invention.
Figure 9:
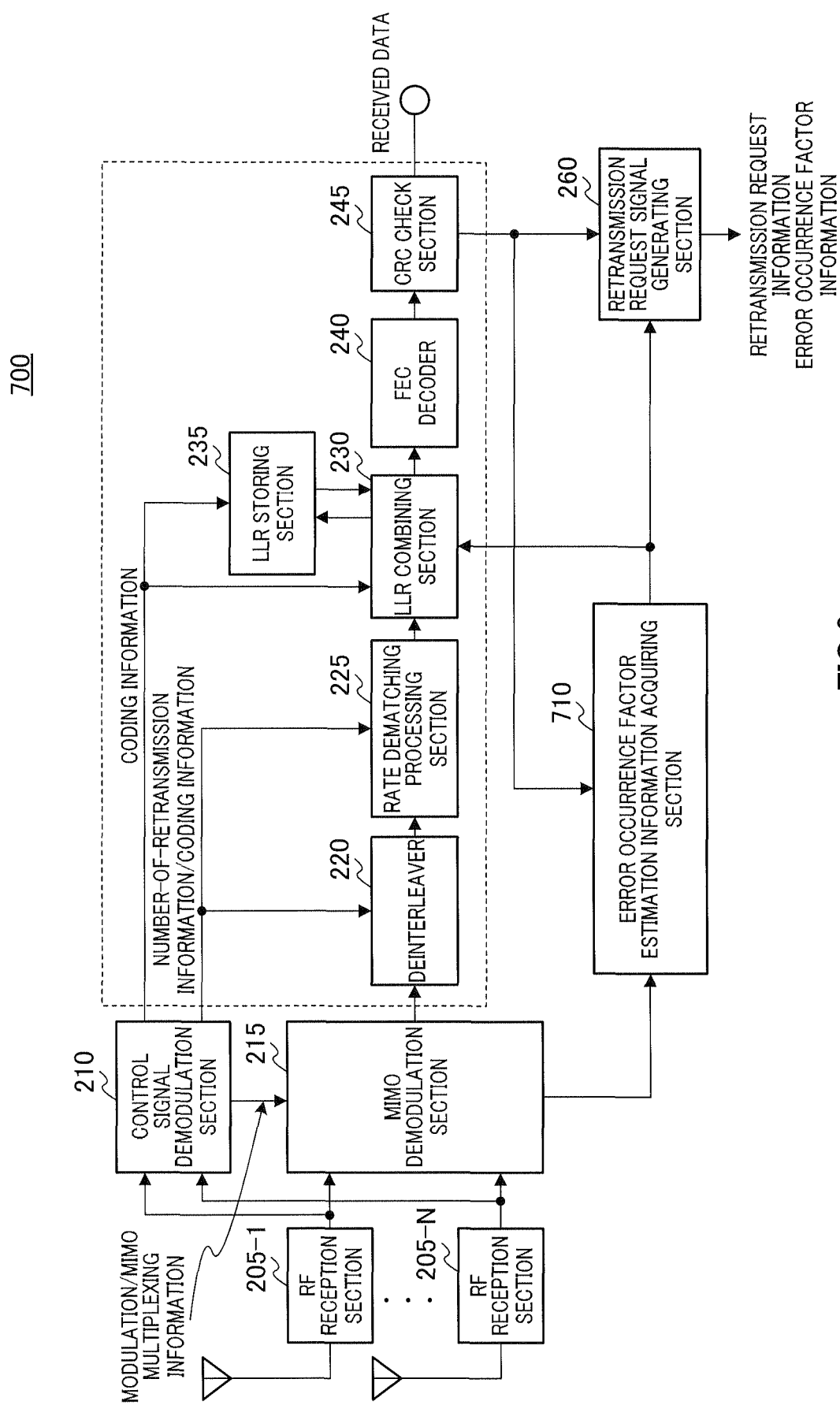
FIG. 9 is a block diagram illustrating a configuration of another wireless communication apparatus (packet receiving side) according to another embodiment of the present invention.

As a specific example, FIGS. 8 and 9 show block diagrams of the transmitting side and receiving side in the case of applying the foregoing to Embodiment 1.

As shown in FIG. 8, wireless communication apparatus 600 on the packet transmitting side has error occurrence factor analysis section 610.

Error occurrence factor analysis section 610 receives the transmission request information and error occurrence factor estimation information transmitted from wireless communication apparatus 700 on the receiving side. Further, the error occurrence factor estimation information is the measurement results of the variation of channel estimation values over time obtained in MIMO demodulation section 215 and the signal intensity of the signal corresponding to each substream extracted in MIMO demodulation section 215, which error occurrence factor analysis section 250 uses for estimating an error occurrence factor in wireless communication apparatus 200 of Embodiment 1.

As shown in FIG. 9, wireless communication apparatus 700 has error occurrence factor estimation information acquiring section 710. This error occurrence factor estimation information acquiring section 710, which differs from error occurrence factor analysis section 250 in wireless communication apparatus 200 of Embodiment 1, does not estimate the error occurrence factor, acquires the measured error occurrence factor estimation information, and outputs the information without modification to retransmission request signal generating section 260.

As described above, wireless communication apparatus 700 is provided with error occurrence factor estimation information acquiring section 710 that acquires the information (the measurement results of the variation of channel estimation values over time obtained in MIMO demodulation section 215 and the measurement value of the signal intensity of the signal corresponding to each substream extracted in MIMO demodulation section 215) for determining whether the dominant error occurrence factor is inter-stream interference or noise, and retransmission request signal generating section 260 that transmits the information to determine the above acquired dominant error occurrence factor.

By this means, for wireless communication apparatus 600 that receives the information for determining the above dominant error occurrence factor, the error occurrence factor of the transmitted packet is able to estimate.

Further, wireless communication apparatus 600 is provided with error occurrence factor analysis section 610 which receives information for determining an error occurrence factor of a transmitted packet, and determines based on the information whether the dominant error occurrence factor is inter-stream interference or noise, and error occurrence factor coping section 140 that changes forming schemes or transmission schemes of a retransmission packet based on a result of the determination.

By this means, it is possible to change forming schemes or transmission schemes of a retransmission packet suitable for the error occurrence factor of the transmitted packet, so that the receiving side of the retransmission packet performs decoding processing and the like suitable for the forming scheme or transmission scheme, thereby improving the efficiency of retransmission control. As a result, throughput is increased in the system.

(2) In Embodiments 1 and 2, wireless communication apparatuses 200 and 400 that are on the packet receiving side determine whether the dominant error occurrence factor is "noise" or "inter-stream interference", and generate the error occurrence factor information indicating noise or inter-stream interference. In other words, choice is made between "noise" and "inter-stream interference". However, the present invention is not limited thereto, and it is also possible to control using a ratio of both factors as error occurrence factor information. In other words, when the wireless communication apparatus on the packet receiving side analyzes that "noise" and "inter-stream interference" have influence in a ratio of 30% and 70% respectively, the ratio of both factors can be included in the error occurrence factor information to report to the transmitting side. Then, the transmitting side receiving the error occurrence factor information executes the processing of generating a retransmission packet and the like using the ratio.

By this means, retransmission packet generation processing that is more practical and useful and that takes into consideration the influence of error occurrence factors is implemented, so that the efficiency of retransmission control improves. As a result, throughput is increased in the system.

A first aspect of a retransmission control method of the present invention is a retransmission control method in MIMO communication, and has a determining step of determining which error occurrence factor is a dominant error occurrence factor, and a step of changing a forming scheme or a transmission scheme for a retransmission packet suitable for the determined error occurrence factor.

In a second aspect of the retransmission control method of the present invention, in the determining step of the dominant error occurrence factor, which of inter-stream interference or noise is the dominant error occurrence factor.

These methods enable selection operation taking into consideration the error occurrence factors upon formation or transmission of a retransmission packet, so that the efficiency of retransmission control improves. As a result, throughput is increased in the system.

In a third aspect of the retransmission control method of the present invention, in the determining step of the dominant error occurrence factor, the inter-stream interference is determined to be the dominant error occurrence factor when a variation of a channel estimation value over time is at or greater than a predetermined level, and noise is determined to be the dominant error occurrence factor when there is a substream having a lower received intensity than a predetermined level.

According to this method, it is possible to specify the dominant error occurrence factor from inter-stream interference and noise.

A first aspect of a wireless communication apparatus of the present invention is a wireless communication apparatus adopting a MIMO communication scheme, and adopts a configuration provided with an error occurrence factor estimation section that determines which error occurrence factor is a dominant error occurrence factor, and a report information generation section that generates information relating to the error occurrence factor or information relating to a forming scheme or a transmission scheme for a retransmission packet suitable for the determined error occurrence factor.

A second aspect of the wireless communication apparatus of the present invention adopts a configuration where the error occurrence factor estimation section determines one of inter-stream interference and noise to be the dominant error occurrence factor.

According to these configurations, feedback information suitable for the error occurrence factor is generated for the packet transmitting side, so that use of the feedback information enables the transmitting side to take measures suitable for the error occurrence factor. As a result, the efficiency of retransmission improves, and throughput is increased in the system.

A third aspect of the wireless communication apparatus of the present invention adopts a configuration where the error occurrence factor estimation section determines inter-stream interference to be the dominant error occurrence factor when a variation of a channel estimation value over time is at or greater than a predetermined level, and determines noise to be the dominant error occurrence factor when there is a sub-stream having a lower received intensity than a predetermined level.

According to this configuration, the dominant error occurrence factor is able to be specified from inter-stream interference and noise.

A fourth aspect of the wireless communication apparatus of the present invention adopts a configuration where the error occurrence factor estimation section calculates a ratio of a degree of influence in occurrence of errors between inter-stream interference and noise, for a result of determining the dominant error occurrence factor.

According to this configuration, the receiving side, which receives the determined result for the dominant error occurrence factor, is able to execute the processing of generating a retransmission packet that is more suitable for the actual situation in consideration of the influence of each error occurrence factor, so that the efficiency of retransmission control can improve. As a result, throughput is increased in the system.

A fifth aspect of the wireless communication apparatus of the present invention is a wireless communication apparatus applying HARQ as a retransmission control scheme, and adopts a decoding section that, when inter-stream interference is determined to be the dominant error occurrence factor and a retransmission packet formed by the forming scheme is in a self-decodable format, performs decoding using the retransmission packet alone.

According to this configuration, the self-decodable format do not need to use the LLR value of the packet that is transmitted earlier and that is supposed to have the adverse influence of inter-stream interference, thereby reducing the influence of inter-stream interference of a decoding result.

A sixth aspect of the wireless communication apparatus of the present invention adopts a configuration where, when the retransmission packet formed by the forming scheme is not in the self-decodable format, the decoder combines a value obtained by multiplying the LLR value obtained from a packet that is transmitted earlier and that corresponds to the retransmission packet by a positive value of less than "1" and the LLR value obtained from the retransmission packet, and performs the decoding.

According to this configuration, a (a positive value of less than "1") is multiplied by the LLR value of the packet which is transmitted earlier and supposed to have the adverse influence by inter-stream interference, so that the influence of inter-stream interference can be reduced, and the value obtained by multiplying $\alpha$ is also used for combination, thereby obtaining coding gain.

A seventh aspect of the wireless communication apparatus of the present invention is a wireless communication apparatus adopts hybrid automatic repeat request as a retransmission control scheme and further comprises a decoding section that, when noise is the determined error occurrence factor, combines a LLR value obtained from a packet that is transmitted earlier and that corresponds to the retransmission packet and a LLR value obtained from the retransmission packet, and performs the decoding.

According to this configuration, decoding can be performed such that the influence of noise reduces.

A first aspect of another wireless communication apparatus of the present invention adopts a configuration provided with a receiving section that receives information about an error occurrence factor of a transmitted packet or information about a forming scheme or a transmission scheme for a retransmission packet suitable for the error occurrence factor and a changing section that changes the forming scheme or the transmission scheme for the retransmission packet based on the received information.

According to this configuration, it is possible to change forming schemes or transmission schemes of a retransmission packet suitable for the error occurrence factor of the transmitted packet, so that the efficiency of retransmission control can improve by the receiving side of the retransmission packet performing decoding processing and the like suitable for the forming scheme or transmission scheme. As a result, throughput is increased in the system.

A second aspect of another wireless communication apparatus of the present invention is the wireless communication apparatus adopts a MIMO communication scheme and further comprises a forming section that, when noise is the dominant error occurrence factor, forms a retransmission packet using a different pattern from a puncturing pattern, a repetition pattern or an interleaving pattern for a packet transmitted earlier.

According to this configuration, it is possible to form a retransmission packet having a different form from a packet that is transmitted earlier, so that the receiving side can utilize for decoding the packet transmitted earlier and the retransmission packet having the different form from the one of the retransmission packet, thereby suppressing noise. As a result, the receiving side can receive the packet correctly in a small number of retransmissions, so that the efficiency of retransmission control can improve, and as a result, the throughput is increased in the system.

A third aspect of another wireless communication apparatus of the present invention is a wireless communication apparatus adopts a MIMO communication scheme and further comprises a transmission section that, when noise is the dominant error occurrence factor, switches to a different mode from a mapping pattern for a modulation symbol of the packet transmitted earlier or stream assignment to antennas, and transmits the retransmission packet.

According to this configuration, it is possible to transmit a retransmission packet in a different transmission scheme from a packet transmitted earlier, so that the receiving side can utilize the packet transmitted earlier and the retransmission packet in a transmission scheme different from that of the packet for decoding, and, suppress "noise". As a result, the receiving side is able to receive the packet correctly in a small number of retransmissions, so that the efficiency of retransmission control can improve, and as a result, the throughput is increased in the system.

A fourth aspect of another wireless communication apparatus of the present invention adopts a configuration provided with a changing section that changes an execution order of a transmission of the retransmission packet and a packet transmission to another user, based on the received information.

According to this configuration, it is possible to control whether a packet where an error occurs is to be retransmitted or to be transmitted to another user suitable for the error occurrence factor, so that the use of the system can be improved by transmitting packet transmission earlier to another user when "inter-stream interference" is the dominant error occurrence factor.

The present application is based on Japanese Patent Application No. 2005-053269, filed on Feb. 28, 2005, the entire content of which is expressly incorporated by reference herein.

INDUSTRIAL APPLICABILITY

The retransmission control method and wireless communication system of the present invention are useful as a retransmission control method and wireless communication system for improving efficiency of retransmission control and improving system throughput.

The invention claimed is:

1. A retransmission control method in multi-input multi-output communication, comprising:
determining which one of a plurality of error occurrence factors including inter-stream interference and noise is dominant; and
changing a forming scheme or a transmission scheme for a retransmission packet according to the error occurrence factor determined to be dominant.

2. The retransmission control method according to claim 1, wherein, the inter-stream interference is determined to be dominant when a variation of a channel estimation value over time is at or greater than a predetermined level, and the noise is determined to be dominant when there is a substream having a lower received intensity than another predetermined level.

3. A wireless communication apparatus adopting a multi-input multi-output communication scheme, comprising:
an error occurrence factor estimation section that determines which one of a plurality of error occurrence factors including inter-stream interference and noise is dominant; and
an information generation section that generates information relating to the error occurrence factor determined to be dominant or information relating to a forming scheme or a transmission scheme for a retransmission packet according to the error occurrence factor determined to be dominant.

4. The wireless communication apparatus according to claim 3, wherein the error occurrence factor estimation section determines the inter-stream interference to be dominant when a variation of a channel estimation value over time is at or greater than a predetermined level, and determines the noise to be dominant when there is a substream having a lower received intensity than another predetermined level.

5. The wireless communication apparatus according to claim 3, wherein the error occurrence factor estimation section calculates a ratio of a degree of influence in an occurrence of errors between the inter-stream interference and the noise, for determining which one of the plurality of error occurrence factors is dominant.

6. The wireless communication apparatus according to claim 3, wherein the wireless communication apparatus adopts hybrid automatic repeat request as a retransmission control scheme and further comprises a decoding section that, when the inter-stream interference is determined to be dominant and a retransmission packet formed by the forming scheme is in a self-decodable format, performs decoding using the retransmission packet alone.

7. The wireless communication apparatus according to claim 6, wherein, when the retransmission packet formed by the forming scheme is not in the self-decodable format, the decoding section combines a value obtained by multiplying a likelihood value obtained from a packet that is transmitted earlier and that corresponds to the retransmission packet by a positive value of less than 1, and a likelihood value obtained from the retransmission packet, and performs the decoding.

8. The wireless communication apparatus according to claim 3, wherein the wireless communication apparatus adopts hybrid automatic repeat request as a retransmission control scheme and further comprises a decoding section that, when the noise is determined to be dominant, combines a likelihood value obtained from a packet that is transmitted earlier and that corresponds to the retransmission packet and a likelihood value obtained from the retransmission packet, and performs the decoding.

9. A wireless communication apparatus comprising:
a receiving section that receives information about a dominant error occurrence factor of a transmitted packet or information about a forming scheme or a transmission scheme for a retransmission packet according to the dominant error occurrence factor, one of a plurality of error occurrence factors including inter-stream interference and noise being determined to be the dominant error occurrence factor; and
a changing section that changes the forming scheme or the transmission scheme for the retransmission packet based on the received information.

10. The wireless communication apparatus according to claim 9, wherein the wireless communication apparatus adopts a multi-input multi-output communication scheme and further comprises a forming section that, when the noise is the dominant error occurrence factor, forms the retransmission packet using a different pattern from a puncturing pattern, a repetition pattern or an interleaving pattern for a packet transmitted earlier.

11. The wireless communication apparatus according to claim 9, wherein the wireless communication apparatus adopts a multi-input multi-output communication scheme and further comprises a transmission section that, when the noise is the dominant error occurrence factor, switches to a different mode from a mapping pattern for a modulation symbol of a packet transmitted earlier or stream assignment to antennas, and transmits the retransmission packet.

12. The wireless communication apparatus according to claim 9, further comprising a changing section that changes an execution order of a transmission of the retransmission packet and a packet transmission to another user, based on the received information.

13. The wireless communication apparatus according to claim 9, further comprising a transmission section that transmits the retransmission packet alone and skips transmitting other packets, based on the received information.

* * * * *